United States Patent [19]

Maier-Laxhuber

[11] Patent Number: 5,404,728
[45] Date of Patent: Apr. 11, 1995

[54] SORPTION AGENT CONTAINER DEVICE AND SORPTION METHOD WITH A REGENERATIVE HEAT EXCHANGE

[75] Inventor: Peter Maier-Laxhuber, Munich, Germany

[73] Assignee: Zeo-Tech (Zeolith Technology) GmbH, Munich, Germany

[21] Appl. No.: 903,506

[22] Filed: Jun. 24, 1992

[30] Foreign Application Priority Data

Jun. 26, 1991 [DE] Germany .................. 41 21 131.6

[51] Int. Cl.⁶ .................. F25B 17/08; F25B 27/02; F25B 29/00; F25B 30/06
[52] U.S. Cl. .................. 62/106; 62/478; 62/480
[58] Field of Search .................. 165/104.12; 62/477, 62/478, 480, 106

[56] References Cited

U.S. PATENT DOCUMENTS 4,637,218  1/1987  Tchernev .................. 62/480
4,952,283  8/1990  Besik .................. 165/7

FOREIGN PATENT DOCUMENTS

3700707  7/1988  Germany .................. 165/104.12

Primary Examiner—John K. Ford
Attorney, Agent, or Firm—Hoffmann & Baron

[57] ABSTRACT

A sorption method and sorption medium container arrangement utilizes two sorption medium containers and at least one heat exchanger for use with each sorption medium container for absorbing or emitting heat. Each sorption medium container is filled with a sorption medium that can adsorb an operating medium by releasing heat and can desorb or expel the operating medium by absorbing heat. The sorption medium container arrangement also includes steam sources or steam troughs which are connected to the sorption medium containers. The steam source or trough is designed to provide or receive operating medium steam. A heat carrier medium flows through the heat exchanger of the first sorption medium container during a first partial operation phase wherein the sorption medium is cooled and the first sorption medium container is heated. The operating medium is subsequently heated by a heater and flows through the heat exchanger of the second sorption medium container wherein the operating medium cools itself by releasing heat to the sorption medium. During a second partial operating phase, the operating medium is initially provided to the second sorption medium container, whose sorption medium is cooled and the sorption medium container is heated. Subsequently the operating medium is heated by the heater and thereafter flows through the heat exchanger of the first sorption medium container wherein the operating medium is cooled and the sorption medium is heated.

14 Claims, 4 Drawing Sheets

SORPTION AGENT CONTAINER DEVICE AND SORPTION METHOD WITH A REGENERATIVE HEAT EXCHANGE

BACKGROUND OF THE INVENTION

1. Field of the Invention

This invention relates to sorption containers, and more particularly to a sorption container and method for regenerative heat exchange between at least two sorption containers.

2. Description of the Prior Art

Typically, in devices and methods providing regenerative heat exchange, a light volatile operating agent is absorbed by a heavier volatile sorption agent as a result of a release of heat energy. The light volatile operating agent can then be subsequently desorbed or separated from the heavier volatile sorption agent as a result of heat adsorption by the sorption agent. The sorption agent may be in liquid as well as in solid form. When using a liquid sorption agent that has become enriched with operating agent, the sorption agent can be pumped between the sorption container which functions as an adsorber and the sorption container which functions as a desorber. During thermal cycling, both the light volatile operating agent and the heavier volatile sorption agent remain in the same container depending on the temperature level which is maintained by the adsorber container and the desorber container. In order for the operating agent to be expelled from the sorption agent, the adsorber container along with the sorption agent and heat exchangers must be heated from a relatively low adsorption temperature to a relatively high desorption temperature and subsequently cooled.

While a heat exchange between solutions that are poor and rich with liquid sorption agents is possible in a relatively simple manner using separate heat exchangers, this can usually only be achieved under very special conditions when solid sorption substances are utilized.

Suggestions to overcome this limitation are found in German Patent No. DE-OS 3207656.8. In this reference, a portion of the sorption agent heat and container heat is transmitted between the two sorption agent containers by means of a heat carrier medium and a relatively expensive apparatus that couples the two sorption medium containers. As a result, it is possible to partially transfer the heat of operation in order to heat the sorption agent and expel the operating medium while forcing it into a second sorption container during its cooling process. As a result, less operating heat has to be generated in order to heat the second sorption medium container. Therefore, the system is able to exchange as much heat as desirable between the two sorption medium containers. In devices such as the one described above, the relationship between the cold that is generated with respect to the heat that is generated can be greatly improved.

An alternative device for exchanging heat between two sorption medium containers is described in "Zeolites: Facts, Figures, Future"; by P.A. Jacobs and R.A. Van Santen on page 519, published in 1989 by Elsevier Science Publishers, B.V. Amsterdam. In this reference, two sorption medium containers are heated by oil. During a first phase, the oil coming from the first sorption medium container is heated in a heater, and flows into the second sorption medium container. The oil is cooled in the second sorption medium container due to the fact that the sorption medium therein absorbs the heat energy. This causes the sorption medium in the second sorption medium container to desorb the operating medium. The oil is subsequently cooled a second time by an oil/air heat exchanger and then provided to the first sorption container by a circulation pump. The oil which is now located in the first sorption container absorbs the heat from the first container thereby cooling the sorption medium contained therein. During the next phase of operation, the oil flow direction is reversed so that unheated oil is provided by the circulation pump to the second sorption medium container wherein the oil is heated while the sorption medium in the second container is cooled. The oil is then sent from the second sorption medium container to the heater where the oil is heated and then pumped into the first sorption medium container. Therein, the heat of the oil is absorbed by the sorption medium of the first container which will cool the oil. Hence, by utilizing this oil cycle, a sorption medium container is cooled and another is heated while the heat losses are only equalized by the heater. This can only be achieved when the sorption medium container heat exchangers are designed so that the heat emitted by the oil is consistently provided to the lowest temperature portions of the sorption medium. This requires maintaining a slowly progressing and severely limited temperature variation along the heat exchanger surface.

The above requirements result in a heat exchanger design wherein only a relatively small area of the face of the heat exchanger transfers heat between the oil and the sorption medium. As a result, the remaining portion of the heat exchanger face is ineffective during the individual partial operating phases. In practical applications, extremely large heat exchanger faces are required which can correspondingly cost a significant amount.

Installations of this type have additional disadvantages. First, only the sorption medium filling that is in close proximity to the hot oil inlet within a sorption medium container is heated. The boundary of the resulting desorption front within the sorption medium will subsequently traverse through all of the sorption medium filling if enough heat is provided. During the heating of the sorption medium, the operating medium is normally desorbed. However, since some areas of the sorption medium may not be heated to the critical desorption temperature level, any desorbed operating medium will not be expelled and liquified into an operating medium steam trough as desired. Instead, the unheated portions of the sorption medium will readsorb the operating medium that is expelled by the heated sorption medium areas. This causes the first operating medium steam that is liquified to be provided to the operating medium steam trough only after heating the sorption medium for a relatively long time after the individual partial operating phase has begun.

Tests have shown that this relatively long heating time may be up to 50% of the total cycle time. Due to the readsorption of the operating medium, the areas of the sorption medium which have not yet been heated by the oil are later heated. The oil is undesirably heated by these heated sorption areas before leaving the sorption medium container. The required severe and limited temperature gradient during the oil cycle is therefore significantly effected. The same negative effect correspondingly occurs in the adsorption phase.

A further disadvantage consists in that due to the relatively slow flow of oil and the long flow path in the heat exchanger, a relatively large volume of oil must be cycled in order to obtain desired results. Therefore, the system becomes so slow that approximately 30 minutes are needed before the first cold production is realized after the initial system startup. As a result, this device is not suitable for relatively short operating times or a cyclical on/off operation.

The final disadvantage is that oil is flammable. Therefore, the use of oil requires various safety measures against overflow and combustion, as well as high drive energies for the circulation pump and expensive heat exchangers for heating or cooling of the oil.

OBJECTS AND SUMMARY OF THE INVENTION

It is an object of the present invention to provide a sorption medium container arrangement and method which permits a heat exchange between two sorption medium containers whereby the effort of material and drive heat is low and the partial operating phases are relatively short.

It is another object of the present invention to obtain a large variation in temperature between the input and output of the heat exchangers so that almost a linear temperature gradient is realized along the heat exchanger.

It is a further object of the present invention to provide a sorption medium container arrangement and method which overcomes the inherent disadvantages of known sorption medium container arrangements and methods.

In accordance with one form of the present invention, a sorption agent container device having a regenerative heat exchange includes two sorption medium containers and at least one heat exchanger for use with each sorption medium container for the purpose of absorbing or emitting heat. Each sorption medium container is filled with a sorption medium that can absorb an operating medium by releasing heat and can desorb or expel the operating medium by absorbing heat. The sorption medium container arrangement also includes steam sources or steam troughs which are connected to the sorption medium containers. The steam source or trough is designed to provide or receive operating medium steam. A heat carrier medium flows through the heat exchanger of the first sorption medium container during a first partial operation phase wherein the sorption medium is cooled and the first sorption medium container is heated. The operating medium is subsequently heated by a heater and flows through the heat exchanger of the second sorption medium container wherein the operating medium cools itself by releasing heat to the sorption medium. During a second partial operating phase, the operating medium is initially provided to the second sorption medium container, whose sorption medium is cooled. Subsequently the operating medium is heated by the heater and thereafter flows through the heat exchanger of the first sorption medium container wherein the operating medium is cooled and the sorption medium is heated.

These and other objects, features and advantages of this invention will be apparent from the following detailed description of the illustrative embodiments thereof, which is to be read in connection with the accompanying drawings.

DETAILED DESCRIPTION OF THE PREFERRED EMBODIMENT

Figure 1:
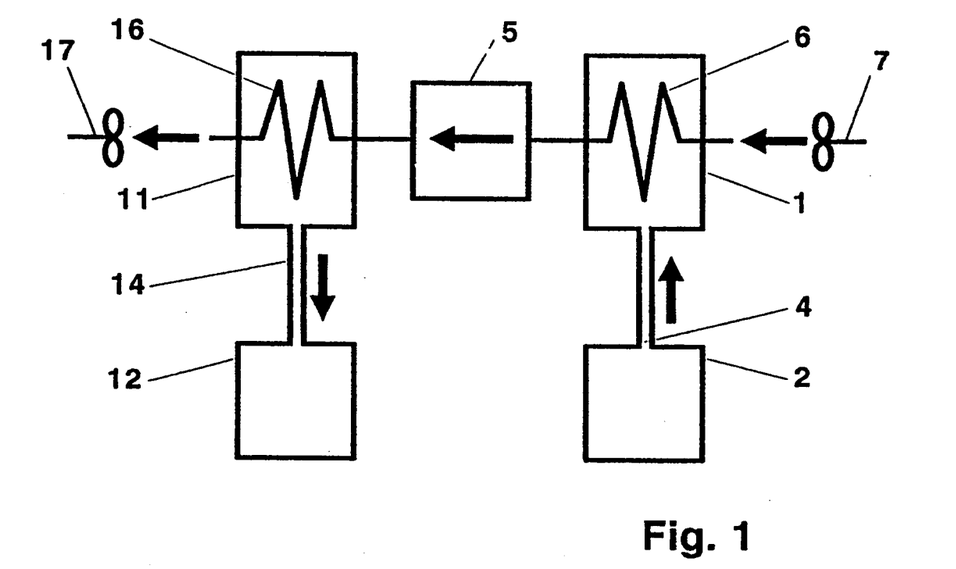
FIG. 1 is a block diagram of a sorption medium container arrangement in accordance with the present invention during a first partial operation phase.
Figure 2:
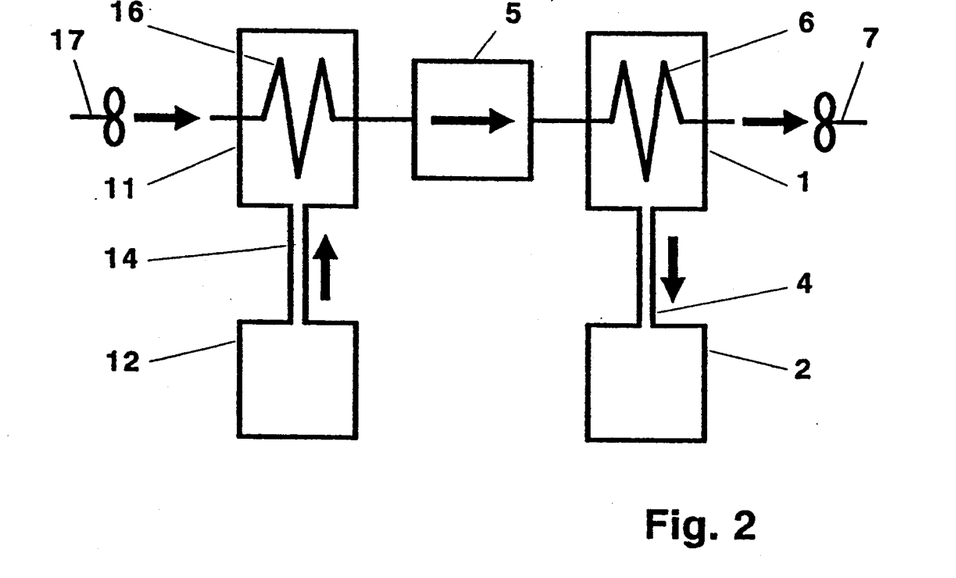
FIG. 2 is a block diagram of the sorption medium container arrangement in accordance with the present invention during a second partial operation phase.

Referring now to FIGS. 1 and 2, a sorption medium container arrangement constructed in accordance with the present invention will now be described. The sorption medium container arrangement includes sorption containers 1 and 11 which are connected with operating medium steam sources/troughs 2 and 12 by means of operating medium steam lines 4 and 14. Preferably, corresponding sorption containers, operating medium steam lines and operating medium steam sources/troughs comprise an airtight closed system. Condensers or evaporators may be utilized as the operating medium steam sources/troughs. However, other comparable devices can perform the desired functions. The operating medium steam sources/troughs are designed to alternatively provide operating medium steam and to remove operating medium steam, from the sorption medium containers 1 and 11. A specific arrangement for the operating medium steam sources/troughs is disclosed in German Patent No. DE-OS 35 21 484.8.

Heat exchangers 6 and 16 extend through the sorption medium filling (not shown) of the sorption medium containers 1 and 11. The heat exchangers are flow connected through heater 5. Ambient air is provided through ventilator 7 and fed through the heat exchanger 6, whereby the ambient air absorbs heat from the sorption medium. This causes the sorption medium of container 1 to cool. The air flowing out of the heat exchanger 6 is then additionally heated by heater 5 and blown into heat exchanger 16. The sorption filling within sorption container 11 absorbs heat from the heated air which in turn cools the air that is provided through the heat exchanger 16. The cooled air is then emitted to the environment by ventilator 17.

According to the first partial operation phase as shown in FIG. 1, operating medium steam is desorbed from the sorption medium in sorption medium container 11 and fed through steam conduit 14 into the operating medium steam trough 12. The operating medium steam is subsequently liquified within the steam trough and stored therein. Simultaneously, operating medium steam is provided by operating medium steam source 2 through operating medium steam line 4 and adsorbed by the sorption medium in sorption medium container 1. The adsorption heat that is released by the sorption medium in container 1 is provided to the heat exchanger 6 and is discharged to the airflow supplied by ventilator 7. The heat from the heat exchanger 6 as well as the desorption heat supplied by the operating medium is carried by the airflow through heater 5. The airflow then passes to the heat exchanger 16 wherein the heat is transferred to the sorption medium of container 11. The airflow provided by ventilators 7 and 17 causes a temperature gradient within the heat exchangers 6 and 16. The temperature is at its highest in each sorption medium at the intersection with heater 5, while the opposite ends of the sorption container are at a correspondingly lower temperature level.

Referring now to FIG. 2, the sorption medium container arrangement of FIG. 1 is illustrated in accordance with the second partial operation phase. During this phase, ambient air is driven by ventilator 17 and fed through heat exchanger 16 and subsequently through heater 5 into heat exchanger 6 of sorption container 1. Therefore, it can be seen that the flow direction is reversed as compared to that of FIG. 1. In the partial operation phase of FIG. 2, the sorption containers 11, 1 as well as the operating medium steam sources/troughs 12, 2 reverse their function as compared to FIG. 1. As a result of the reversal of airflow from the environment, the sorption medium within sorption medium container 11 is cooled. Thus, operating medium steam is provided through the operating medium steam conduit 14 from operating medium steam source 12. The ambient air that is provided by ventilator 17 and heated within heat exchanger 16 is emitted from the heat exchanger and heated in heater 5. The airflow is fed into heat exchanger 6 so as to transfer heat through the heat exchanger 6 to the sorption medium of sorption container 1. The operating medium trapped within the sorption medium in sorption container 1 is desorbed and the operating medium steam is emitted through the operating medium steam line 4 to the operating medium trough 2 as shown in FIG. 2. As a result of the above process, the air exiting the heat exchanger 6 is noticeably cooler than the air which first entered heat exchanger 6. However, the air leaving heat exchanger 6 is still hotter than the ambient air that was provided by ventilator 17. Additionally, during this partial operating phase, the portions of the heat exchanger which are closer to the heater 5 are noticeably hotter than the other portions of the heat exchanger.

Subsequent to the second partial operation phase as illustrated by FIG. 2, the flow direction of the ventilators 7 and 17 and the resulting airflow is reversed so that the system operation is continued in accordance with FIG. 1.

Figure 3:
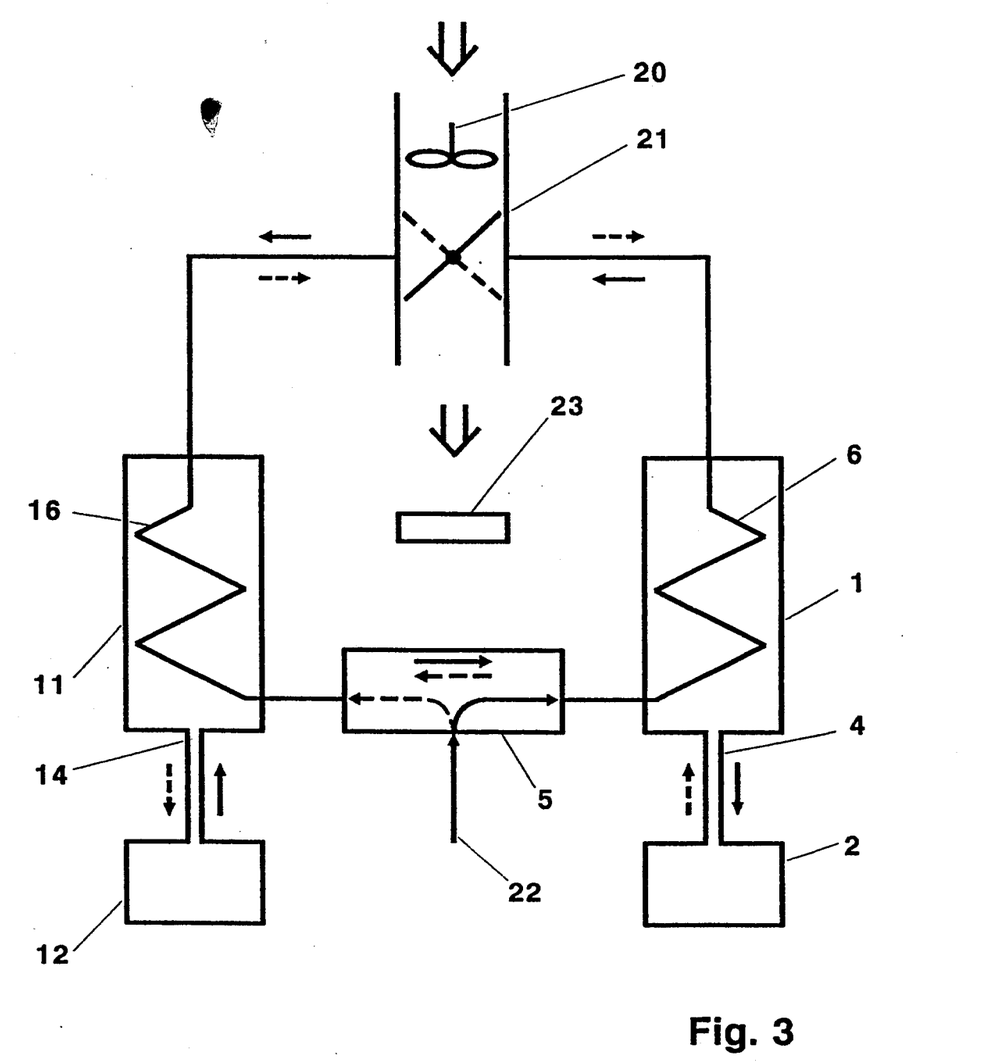
FIG. 3 is block diagram of the sorption medium container arrangement in accordance with the present invention having a mixing chamber and a switching flap.

Referring now to FIG. 3, sorption medium containers 1 and 11, operating medium steam conduits 4 and 14 as well as the operating medium steam sources/troughs 2 and 12 are present as previously described with regard to FIGS. 1 and 2. FIG. 3 simultaneously illustrates both partial operating phases of FIGS. 1 and 2.

Referring to FIG. 3, air blower 20 provides an ambient airflow which is fed through flap 21 causing flap 21 to rotate in a counterclockwise direction. The airflow is provided through heat exchanger 16 where the airflow is heated. Thereafter, the airflow is forced into heater 5 wherein the airflow is additionally heated. Within heater 5, the airflow is admixed with hot exhaust gas 22 which heats the airflow. In the heated condition, the airflow/exhaust gas mixture enters the heat exchanger 6 and transfers heat through the heat exchanger 6 to the sorption medium of sorption container 1. This transfer of heat permits the airflow/exhaust gas mixture to cool. The airflow/exhaust gas mixture then leaves the sorption container 1 and is fed through flap 21. Since the exhaust air is hotter than the ambient air that is continually provided by air blower 20, an additional heat exchanger 23 is connected at the airflow/exhaust gas mixture outlet in order to absorb any residual heat remaining in the airflow/exhaust gas mixture. The heat exchanger 23 can be of any known type including devices such as a hot water heater.

At the conclusion of the first partial operation phase, and before the second operation phase begins, the flap 21 is adjusted by 90° (shown in phantom). As a result of the rotation, ambient air is fed through air blower 20 in a clockwise direction through heat exchanger 6, heater 5, heat exchanger 16 and subsequently through heat exchanger 23. In a manner similar to that of the first partial operation phase, during the second partial operation phase, hot exhaust gas 22 is admixed in heater 5 with the airflow provided from heat exchanger 6. This combined airflow/exhaust gas mixture is then fed into heat exchanger 16. The adsorption or desorption reactions within sorption containers 1 and 11 occur, as a result of the transfer of heat, in a manner similar to that previously described in connection with FIGS. 1 and 2.

Figure 4:
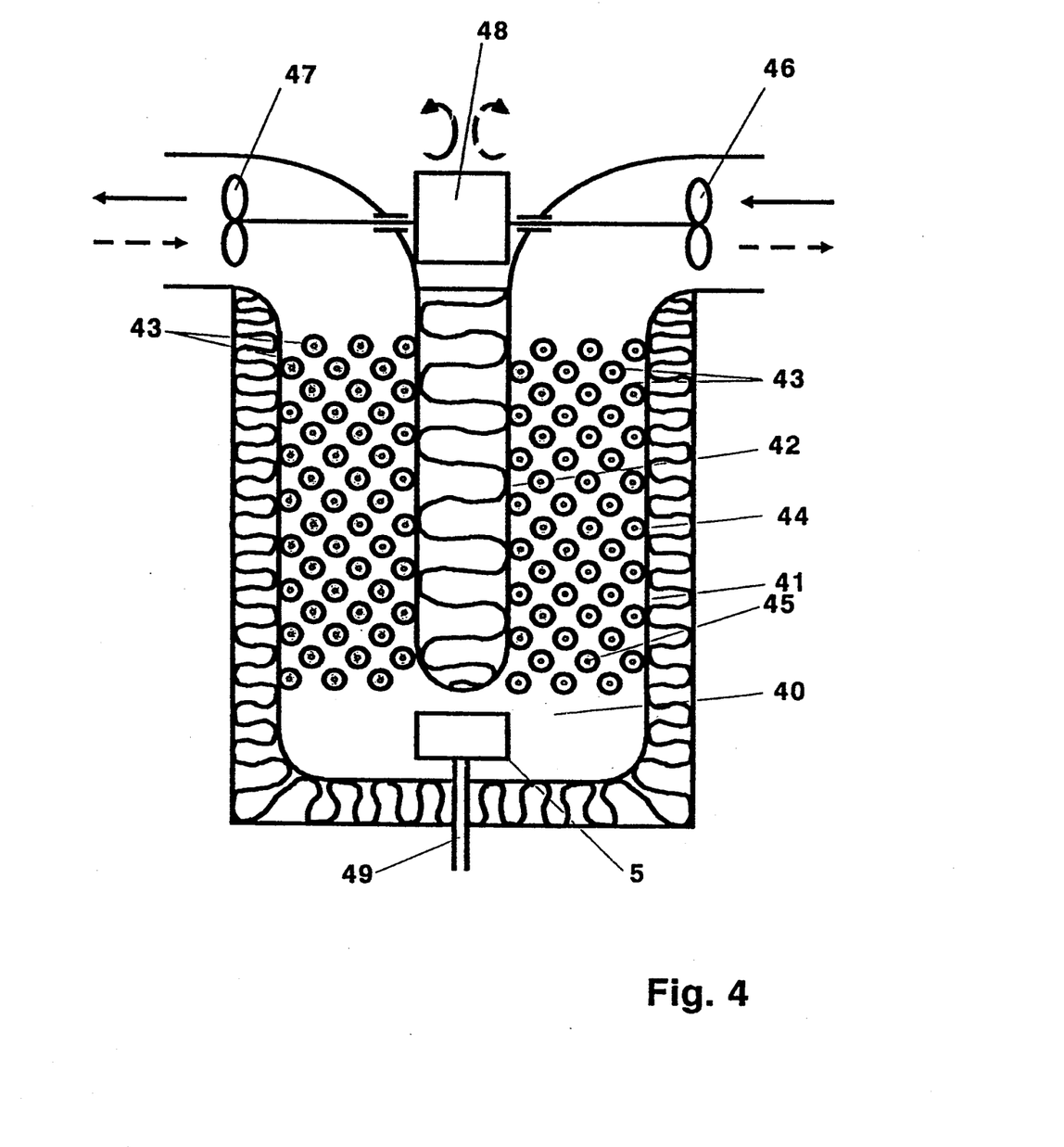
FIG. 4 is a cross-sectional view of the sorption medium container arrangement in accordance with the present invention having an air blower.

Referring now to FIG. 4, an additional embodiment of a sorption medium container is illustrated in a cross-sectional view. A heat insulated U-shaped flow conduit 40 is formed from limiting walls 41 and 42. In the two straight portions of the flow conduit 40, two sorption medium container bundles are provided which consist of metal corrugated hoses 43. Each corrugated hose contains sorption medium 44 and a flow conduit 45. Located at the open ends of the U-shaped flow conduit 40 are ventilators 46 and 47 which are driven by an electromotor 48. The ventilators can alternately change their rotational direction so that air being fed by the ventilators can also change flow direction.

For example, during the first partial operation phase, ambient air is provided by ventilator 46 and forced through the right hand portion of the U-shaped flow conduit 40 having sorption medium 44 contained within metal corrugated hose 43. A heater 5 is provided at the bottom of the U-shaped flow conduit. The heater 5, which may be a propane gas burner having a feed line 49, ignites and burns the propane gas together with the airflow being fed by ventilator 46. As a result of this combustion process, the air that is provided through the right corrugated hose bundle is heated and fed through the left hand portion of the U-shaped flow conduit. Thereafter, the airflow is discharged to the environment by ventilator 47.

As a result of the above process, the right side of the U-shaped flow conduit 40 is cooled while the left side of the U-shaped flow conduit is heated. Upon changing the rotational direction of drive motor 48, air is fed in the reverse direction. When the rotational directions are changed, the ambient air that is provided by ventilator 47 is heated within the left hand portion of the U-shaped flow conduit and further heated by the gas burner. As a result, the heat that is absorbed by the airflow is transferred to the sorption medium contained within the corrugated hoses in the right hand portion of the U-shaped flow conduit. This arrangement permits control of the sorption process without utilizing a flap as disclosed in connection with FIG. 3.

Figure 5:
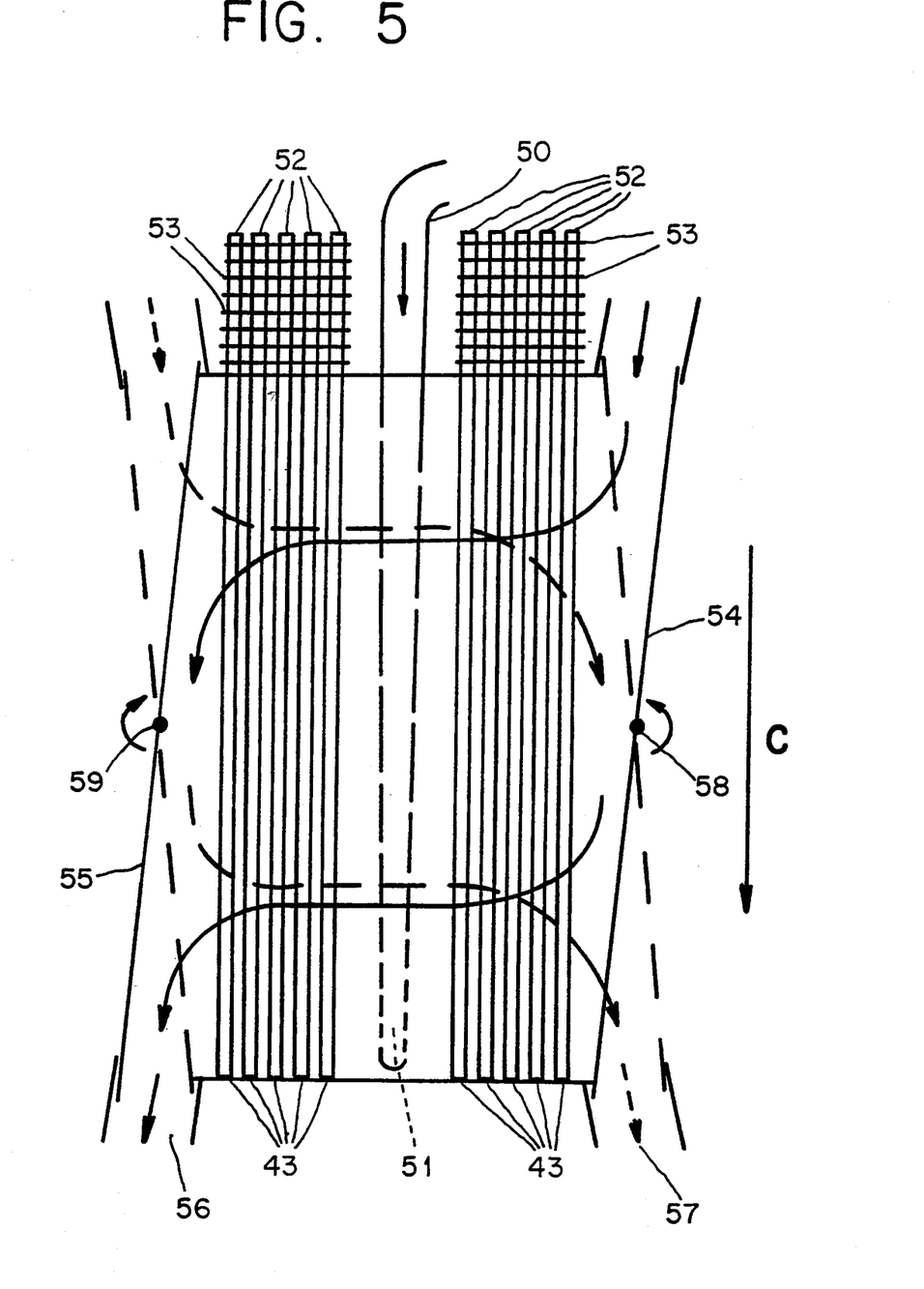
FIG. 5 is a cross-sectional view of the sorption medium container arrangement in accordance with the present invention with a flap control which directs airflow.

Referring now to FIG. 5, a sorption medium container arrangement is shown which can be provided, for example, at the end of an exhaust pipe 50. Two sorption medium containers are symmetrically positioned around the perforated pipe end 51 of the exhaust pipe 50. The sorption medium containers consist of metal corrugated hoses 43 which are confined within two sorption medium container bundles. One end of the group of metal corrugated hoses 43 is connected with condenser/evaporator pipes 52 which are provided with heat exchanger lamellas 53 in order to emit the condenser heat to the ambient air. Alternatively, the condenser/evaporator pipes and heat exchange lamellas can be used during evaporation of the operating medium to absorb heat from the environment.

The total sorption medium container arrangement in accordance with FIG. 5 is in parallel with a strong airflow characterized by arrow C. The airflow C may be generated by the movement of a travelling motor vehicle. Utilizing two pivotable flaps 54 and 55, the right sorption medium container bundle has airflow C flowing thereon. After hot exhaust air had been admixed with the airflow by the perforated pipe end 51, the left sorption medium container bundle has the airflow C flowing thereon. The airflow/exhaust gas mixture leaves the system through outlet 56. In order to reverse the process, the flaps 54 and 55 are moved to the positions shown in phantom by rotating pivotable flaps about rotating axis 58 and 59. As a result, airflow C is first forced over the left sorption medium container bundle, then further heated by hot exhaust gases. Finally, it flows through the right hand bundle and exits the system through outlet 57.

The advantage of the arrangement according to FIG. 5 is that no ventilators or blowers are required for operation. By simply readjusting flaps 54 and 55, the flow within the sorption medium container system is changed. With an arrangement of the system at the end of the exhaust pipe of a motor vehicle, an "air conditioning" system may be operated from the heat contained in the hot exhaust gases.

By utilizing a gas mixture as the heat carrier medium, specific advantages with respect to the state of the art sorption agent container devices with a regenerative heat exchange are obtained. In particular, the use of air as the heat transfer medium renders the use of an oil/air-cooler and an oil circulation pump unnecessary since the present invention utilizes the ambient air as the heat trough. As a result, the gas mixture that is emitted from the second heat exchanger does not need to be additionally cooled before reentering the first heat exchanger. By employing ambient air, the heat carrier flow is at the lowest possible starting temperature level. Thus, it can significantly cool the first sorption medium filling and achieve an optimal adsorption reaction.

The inventive heat exchanger device of the present invention is designed so that it does not bring the total sorption medium filling to a possible uniform high or low temperature level as is known from the state of the art devices. The present device is designed to obtain a large temperature gradient between the input and the output of the heat exchangers. An almost linear temperature gradient can be expected along the heat exchanger.

Since the operating medium steam pressure is generally uniform within the sorption medium container, each portion of the sorption medium that has different concentrations of operating medium causes varying temperature ranges. The present invention is designed so that the heat exchange geometry can accommodate a relatively large charge volume in each sorption medium part and can simultaneously optimize the heat transfer to the heat carrier medium so that as much heat as possible can be transmitted between the two sorption medium containers.

Aside from the unavoidable heat losses, energy must be provided by the heater in order to heat the gas mixture that will be emitted from the second sorption container. Depending on the optimization of the heat exchanger, the heat loss is only a fraction of that required for the desorption of a sorption container. The efficiency number which, for example, is at 0.3 to 0.4 with a zeolite/water-sorption substance without an inner heat exchanger can be improved to values of over 1 by utilizing the present invention.

As a result of the present invention, a simple air blower may be used instead of the prior art oil circulation pump. The air blower is particularly advantageous because it requires less energy to operate as compared to an oil circulation pump and no safety precautions are required. In addition, the total weight of the sorption agent device is clearly reduced as a result of not needing to incorporate safety devices and the heavy oil filling. Moreover, a controlled airflow through the heat exchanger is not as complicated as compared to an oil cycle.

When using a gas as a heat carrier medium, a limited temperature variance cannot be achieved within the sorption medium filling. However, the limited temperature variance is compensated in that the heat exchanger geometry is selected in such a manner that a relatively high temperature gradient occurs between the input of the heat carrier gas mixture and the corresponding output. In addition, during the reversal of the flow direction, the temperature gradient of the gas mixture is maintained. The temperature level changes only during the adsorber mode of operation when it becomes low and during the desorber mode of operation when it becomes correspondingly high.

When using zeolite as the sorption medium, a further temperature range can be observed. For example, the range of the lower temperature end of the sorption medium filling fluctuates between 40° C. during the adsorption phase and 160° C. during the desorption phase. At the same time, the temperature of the hot end of the sorption medium filling fluctuates between 140° and 280° C.

It is particularly advantageous that the heating of the airflow between the two heat exchangers is performed by admixing the airflow with hot gases, specifically combustion gases. As a result of admixing the combustion gases with the airflow, an additional heat exchanger and its corresponding large heat exchanger surface is eliminated. The hot gases that are admixed with the ambient air may be exhaust gases of a mobile or stationary combustion engine or they may be directly generated by an oil or gas burner. As a result, the hot combustion gases that are admixed in the heater with the ambient airflow are provided through the heat exchanger of the second sorption exchanger while flowing through the second sorption container. The gas mixture cools off by emitting heat to the sorption medium filling. During the next partial operation phase, the flow direction of the air is reversed so that now the air is heated in the second heat exchanger and then both the exhaust gases and the airflow are fed through the first heat exchanger. In this manner, the heat exchangers are part of the exhaust gas lines. Hence, the flow direction of the exhaust gases is solely defined by the predetermined flow direction of the gas mixture.

Preferably, the flow direction of the gas mixture can be manipulated by air blowers or ventilators. Thereby, the natural flow may be helped by the addition of air-flow aids such as the suction effect of an exhaust flue.

The mechanism for driving the blower or ventilator for feeding the gas mixture is generally performed by electromotors. However, it may also be beneficial that the drive be performed by hot combustion gases such as occurs with exhaust gas turbines.

In these cases, a change of the flow direction may be performed by varying flap positions, whereby the need for change is indicated by a thermostat. Bi-metals or so-called memory metals, which have a large expansion at a defined temperature, may also be utilized to alter the flow direction in response to a change in temperature.

A further advantage to employing gas mixtures as heat carriers consists in that the heat carrier medium itself has a low noticeable heat capacity. Therefore, when a suitable heat exchange geometry is implemented, a faster switch over of the flow direction is possible. This results in shorter cycle times and higher sorption efficiency. On the other hand, the sorption efficiency, the amount of sorption medium and the device volume may be reduced.

Particularly advantageous heat exchanger geometries may be obtained by using so-called metal corrugated hoses. As a result, the sorption medium is positioned in the inner range of the corrugated hose, particularly in the wave crests. A flow conduit for the operating medium steam extends through the center of the corrugated hose within the sorption medium filling. Each of the hose ends are connected with the given operating medium steam trough or source. A plurality of these corrugated hoses may be arranged in a bundle and may be admitted transversely to the corrugated hose axis from the outside. In this manner, a very efficient sorption medium container may be built which substantially consists of heat exchangers (i.e., corrugated hoses). The corrugated hoses should be pressure and vacuum resistant and may be made from very thin walled sheet metal. In this way, the container has a relatively small percentage of weight as compared to the sorption medium filling. The particular arrangement of the bundles results in each corrugated hose running through a temperature range specific for each hose depending on its position within the corrugated hose bundle.

For example, the lowest sorption temperature of a corrugated hose may be 100° C. and its highest desorption temperature at 240° C., while the sorption medium in the adjacent corrugated hose has the lowest adsorption temperature of 115° C. and reaches the highest desorption temperature of up to 255° C. As a result, each sorption medium portion has a very high temperature fluctuation range.

When employing zeolite as the sorption medium and water as the operating medium, the total sorption system operates in the vacuum pressure range in every operation phase. Consequently, as a result of the flexibility of the corrugated hoses, the hose is shortened in the axial direction. Thus, each corrugation is pressed onto the solid zeolite filler within the corrugations and the heat transfer from the gas mixture to the inner sorption medium filling is improved.

Good results are also obtained when the corrugated hoses have the solid sorption medium in the wave troughs on the outside of the corrugated hose and the gas mixture is fed in an axial direction within the corrugated hose. Similar to that previously described, a temperature gradient is generated between the input of the gas mixture and the output from the corrugated hose. This means that sorption medium portions at the hot end of the heat exchanger operate with noticeably higher temperatures than the sorption medium portions on the opposite end of the heat exchanger.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A sorption medium container arrangement having a regenerative heat exchange capability comprising:
   a) first and second sorption medium containers having sorption medium therein, the sorption medium being capable of adsorbing an operating medium by releasing heat energy, the sorption medium being capable of desorbing the operating medium by taking up heat energy;
   b) first and second heat exchangers being located within the first and second sorption medium containers respectively, the first and second heat exchangers receiving a gaseous heat carrier medium and performing one of absorbing heat from and emitting heat to the gaseous heat carrier medium, gaseous heat carrier medium being ambient air;
   c) first and second steam source/sink of operating medium being coupled to the first and second sorption medium containers respectively, the first and second steam sources/sinks of operating medium alternately providing operating medium vapor to and adsorbing operating medium vapor from the sorption medium; and
   d) means for heating the gaseous heat carrier medium interposed between the first and second sorption containers, the means for heating receiving the gaseous heat carrier medium at a first temperature and providing the gaseous heat carrier medium at a second temperature;
   wherein during a first partial operating phase, the heat carrier medium in the form of fresh ambient air is provided to the sorption medium container arrangement and flows through the first sorption container thereby cooling the first sorption medium container and the sorption medium therein, the heat carrier medium being heated by the heating means and flowing through the heat exchanger of the second sorption container, the sorption medium of the second sorption medium container taking up the heat energy of the heat carrier medium thereby cooling the heat carrier medium, the heat carrier medium being expelled from the sorption medium container arrangement and wherein during a second partial operating phase, the heat carrier medium in the form of fresh ambient air is provided to the sorption medium container arrangement and flows through the heat exchanger of the second sorption medium container and takes up heat from the sorption medium of the second sorption container thereby heating the heat carrier medium and cooling the second sorption medium container, the heat carrier medium being provided to the heating means and being heated therein, the heat carrier medium flowing through the heat exchanger of the first sorption medium container, the sorption medium of the first sorption container taking up heat energy of the heat carrier medium and thereby cooling the heat carrier medium and heating the first sorption medium container, the heat carrier medium being expelled from the sorption medium container arrangement.

2. A sorption medium container arrangement having a regenerative heat exchange capability as defined by claim 1 further comprising first and second ventilator means coupled to the first and second heat exchangers respectively, the first and second ventilators providing the gaseous heat carrier medium to the first and second heat exchangers.

3. A sorption medium container arrangement having a regenerative heat exchange capability as defined by claim 1 wherein a flow of the gaseous heat carrier medium is selected by the heating means.

4. A sorption medium container arrangement having a regenerative heat exchange capability as defined by claim 1 wherein the first and second heat exchangers are formed from a plurality of individual containers which contain sorption medium therein, the plurality of individual containers being arranged so that the heat carrier medium flows substantially around the plurality of individual containers.

5. A sorption medium container arrangement having a regenerative heat exchange capability as defined by claim 1 wherein the heat exchangers comprise metal corrugated hose.

6. A sorption medium container arrangement having a regenerative heat exchange capability as defined by claim 1 wherein the heat exchangers are arranged so that the temperature of the heat carrier medium is altered as it flows through the heat exchanger.

7. A sorption medium container arrangement having a regenerative heat exchange capability as defined by claim 1 wherein the heat exchangers are arranged so that a relative uniform temperature gradient is generated along the flow path of the heat carrier medium.

8. A sorption medium container arrangement having a regenerative heat exchange capability as defined by claim 7 wherein the relative uniform temperature gradient is maintained during a change in the flow direction of the heat carrier medium.

9. A sorption medium container arrangement having a regenerative heat exchange capability as defined by claim 1 wherein the heating means includes means for admixing exhaust combustion gases with the gaseous heat carrier medium, the exhaust combustion gases providing heat energy to the heat carrier medium so as to raise the temperature of the heat carrier medium.

10. A method for providing regenerative heat exchange capability to a sorption medium container arrangement having a flow path and having first and second sorption medium containers possessing sorption medium therein, first and second heat exchangers respectively coupled to each sorption medium container, first and second steam source/sink respectively coupled to each sorption medium container and heating means operatively coupling the first and the second sorption medium containers, the method comprising:
a) providing operating medium steam from the first steam source/sink to the sorption medium of the first sorption medium container;
b) providing a heat carrier medium to the first heat exchanger for passage therethrough, the heat carrier medium being a gas;
c) releasing heat energy from the sorption medium of the first sorption medium container to the heat exchanger means of the first sorption medium container;
d) releasing heat energy from the heat exchanger means of the first sorption medium container to the heat carrier medium;
e) providing the heat carrier medium to the heating means;
f) providing the heat carrier medium to the second heat exchanger for passage therethrough;
g) releasing the heat of the heat carrier medium to the sorption medium of the second sorption container while the same is passing therethrough;
h) maintaining a relative uniform temperature gradient along the flow path of the heat carrier medium, the relative uniform temperature gradient being maintained during a change in flow direction of the heat carrier medium; and
i) expelling the heat carrier medium from the sorption medium container arrangement to the ambient environment.

11. A method for providing regenerative heat exchanger capability to a sorption medium container arrangement as defined by claim 10 further comprising heating the heat carrier medium in the heating means in order to increase the temperature of the heat carrier medium before the heat carrier medium is provided to the second heat exchanger.

12. A method for providing a regenerative heat exchange capability to a sorption medium container arrangement as defined by claim 11 wherein the temperature of heat carrier medium is increased in the heating means by admixing the heat carrier medium with combustion gases.

13. A method for providing a regenerative heat exchange capability to a sorption medium container arrangement as defined by claim 12 wherein the volume of combustion gases is determined by the volume of heat carrier medium.

14. A method for providing a regenerative heat exchange capability to a sorption medium container arrangement as defined by claim 10 wherein a relative flow of the heat carrier medium is determined by the differences in density of the heat carrier medium at locations within the sorption medium container arrangement.

* * * * *